(12) United States Patent
Peh et al.

(10) Patent No.: US 11,494,111 B2
(45) Date of Patent: Nov. 8, 2022

(54) DATA OPERATION BASED ON VALID MEMORY UNIT COUNT

(71) Applicant: Micron Technology, Inc., Boise, ID (US)

(72) Inventors: Woei Chen Peh, Singapore (SG); Chandra Mouli Guda, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/125,872

(22) Filed: Dec. 17, 2020

(65) Prior Publication Data

US 2022/0197535 A1    Jun. 23, 2022

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 7,610,437 | B2* | 10/2009 | Sinclair | G06F 3/0652 |
| | | | | 711/104 |
| 7,984,084 | B2* | 7/2011 | Sinclair | G06F 16/1847 |
| | | | | 707/818 |
| 8,285,918 | B2* | 10/2012 | Maheshwari | G06F 12/0891 |
| | | | | 711/159 |
| 8,443,263 | B2* | 5/2013 | Selinger | G06F 11/1068 |
| | | | | 714/768 |
| 8,873,284 | B2* | 10/2014 | Sinclair | G06F 12/0246 |
| | | | | 365/185.11 |
| 9,223,693 | B2* | 12/2015 | Sinclair | G06F 12/0246 |
| 9,336,133 | B2* | 5/2016 | Sinclair | G06F 12/0246 |
| 9,348,746 | B2* | 5/2016 | Sinclair | G06F 12/0246 |
| 9,465,731 | B2* | 10/2016 | Sinclair | G06F 3/0688 |

(Continued)

FOREIGN PATENT DOCUMENTS

CN            109656483 A  *  4/2019  ........... G06F 3/0616

OTHER PUBLICATIONS

Merriam-Webster, "subsequent", Dec. 28, 2019, pp. 1-11, https://web.archive.org/web/20191228112234/https://www.merriam-webster.com/dictionary/subsequent (Year: 2019).*

*Primary Examiner* — Christopher D Birkhimer
(74) *Attorney, Agent, or Firm* — Schwegman Lundberg & Woessner, P.A.

(57) ABSTRACT

A memory device includes a plurality of groups of memory blocks, each group including a plurality of blocks, and each block including a plurality of memory units. A memory controller for the memory device performs operations including maintaining a count of valid memory units in the group for each group and maintaining a count of valid memory units in each block of the memory device. The operations further include selecting a first group based on a count of valid memory units and the first group including a target plurality of blocks. The operations further include selecting a first target block from the target plurality of blocks, determining whether the first target block is to be erased, and erasing the first target block in response to determining that the first target block is to be erased.

20 Claims, 9 Drawing Sheets

(56) References Cited

U.S. PATENT DOCUMENTS

| | | | |
|---|---|---|---|
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 10,120,613 B2* | 11/2018 | Sinclair | G06F 12/02 |
| 10,133,490 B2* | 11/2018 | Sinclair | G06F 3/0655 |
| 10,430,279 B1* | 10/2019 | Dittia | G06F 3/0656 |
| 10,635,350 B2* | 4/2020 | Singhal | G06F 3/0679 |
| 10,642,502 B2* | 5/2020 | Sharon | G06F 12/10 |
| 10,642,513 B2* | 5/2020 | Marcu | G06F 3/0679 |
| 10,656,872 B2* | 5/2020 | Gavens | G06F 3/0655 |
| 10,691,372 B1* | 6/2020 | Seetharaman | H01L 27/11556 |
| 10,712,976 B2* | 7/2020 | Sela | G06F 12/0246 |
| 10,713,157 B2* | 7/2020 | Widder | G06F 3/0658 |
| 10,719,267 B2* | 7/2020 | Rai | G06F 3/061 |
| 10,725,699 B2* | 7/2020 | Hsu | G11C 16/32 |
| 10,725,705 B1* | 7/2020 | Eliash | G11C 16/10 |
| 10,725,781 B1* | 7/2020 | Avraham | G06F 3/0679 |
| 10,725,835 B2* | 7/2020 | Benisty | G06F 3/0679 |
| 10,725,901 B2* | 7/2020 | Muthiah | G06F 13/1626 |
| 10,732,847 B2* | 8/2020 | Bazarsky | G11C 29/52 |
| 10,732,848 B2* | 8/2020 | Navon | G06F 3/0659 |
| 10,817,182 B2* | 10/2020 | Benisty | G06F 3/0688 |
| 10,824,376 B2* | 11/2020 | Hsu | G06F 9/30185 |
| 10,846,017 B2* | 11/2020 | Agarwal | G06F 3/0611 |
| 10,860,228 B1* | 12/2020 | Mulani | G06F 3/0604 |
| 10,866,740 B2* | 12/2020 | Benisty | G06F 3/0659 |
| 10,983,715 B2* | 4/2021 | Sharoni | G06Q 20/105 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G06F 12/0638 |
| | | | 711/103 |
| 2011/0161784 A1* | 6/2011 | Selinger | G06F 11/1016 |
| | | | 714/E11.002 |
| 2014/0013032 A1* | 1/2014 | Min | G06F 12/0246 |
| | | | 711/103 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2016/0246713 A1* | 8/2016 | Choi | G06F 3/0608 |
| 2017/0123655 A1* | 5/2017 | Sinclair | G06F 3/061 |
| 2017/0220274 A1* | 8/2017 | Park | G06F 11/1451 |
| 2017/0357458 A1* | 12/2017 | de Silva | G06F 3/065 |
| 2018/0373433 A1* | 12/2018 | Ke | G06F 3/0679 |
| 2019/0073136 A1* | 3/2019 | Chang | G06F 3/0679 |
| 2019/0146679 A1* | 5/2019 | Doh | G06F 3/0679 |
| | | | 711/103 |
| 2019/0205246 A1* | 7/2019 | Choi | G06F 3/0652 |
| 2020/0089420 A1* | 3/2020 | Sharoni | G06F 21/79 |
| 2020/0159443 A1* | 5/2020 | Shanmugasundaram | |
| | | | G06F 3/0655 |
| 2020/0174695 A1* | 6/2020 | Bazarsky | G06F 3/061 |
| 2020/0174702 A1* | 6/2020 | Byun | G06F 3/0652 |
| 2020/0183610 A1* | 6/2020 | Seetharaman | G06F 3/0616 |
| 2020/0192602 A1* | 6/2020 | Benisty | G06F 3/0653 |
| 2020/0218458 A1* | 7/2020 | Mulani | G06F 3/0688 |
| 2020/0225870 A1* | 7/2020 | Eliash | G06F 3/0604 |
| 2020/0242038 A1* | 7/2020 | Bazarsky | G06F 3/0629 |
| 2020/0310682 A1* | 10/2020 | Benisty | G06F 13/1642 |
| 2020/0341691 A1* | 10/2020 | Hsu | G11C 16/10 |
| 2020/0356311 A1* | 11/2020 | Hsu | G06F 3/0679 |
| 2020/0379643 A1* | 12/2020 | Muthiah | G06F 3/0659 |
| 2020/0387427 A1* | 12/2020 | Mekhanik | H03M 13/036 |

* cited by examiner

DATA OPERATION BASED ON VALID MEMORY UNIT COUNT

TECHNICAL FIELD

Embodiments of the disclosure relate generally to memory sub-systems, and more specifically, relate to data operations based on valid memory unit count, which can be part of a memory sub-system.

BACKGROUND

The memory sub-system can include one or more memory components that store data. The memory devices can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
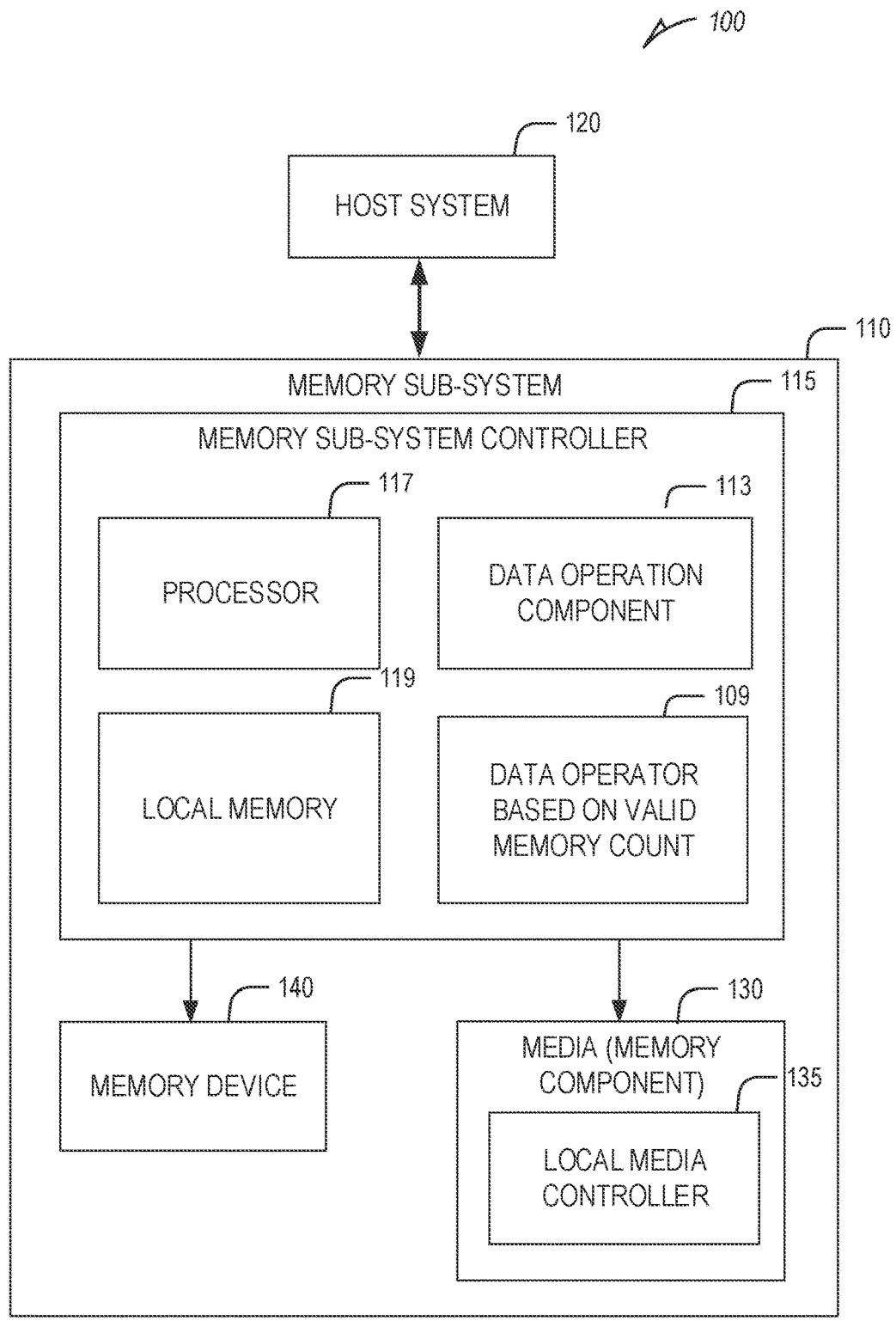
FIG. 1 illustrates an example computing environment that includes a memory sub-system in accordance with some embodiments of the present disclosure.

Aspects of the present disclosure are directed to data operations based on valid memory counts of memory units on a memory device, which can be part of a memory sub-system, where the operations can enable the memory device to maintain clean memory cells for storing data within its physical memory locations (e.g., a page) of the memory device. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory device can be a non-volatile memory device. One example of a non-volatile memory device is a negative-and (NAND) memory device. Other examples of non-volatile memory devices are described below in conjunction with FIG. 1. Some memory devices, such as NAND memory devices, include an array of memory cells (e.g., flash cells) to store data. Each cell includes a transistor, and within each cell, data is stored as the threshold voltage of the transistor, based on the logical value of the cell (e.g., 0 or 1). Memory cells in these devices can be grouped as pages that can refer to a logical unit of the memory device used to store data. For example, memory cells in NAND memory devices are connected horizontally at their control gates to a word line to form a page. With some types of memory devices (e.g., NAND), pages are grouped to form blocks (also referred to herein as "memory blocks").

The host system can send access requests (e.g., write command, read command) to the memory sub-system, such as to store data on a memory device at the memory sub-system, read data from the memory device on the memory sub-system, or read/write constructs with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can include error handling data (e.g., error-correcting code (ECC) codeword, parity code), data version (e.g., used to distinguish age of data written), valid bitmap (which LBAs or logical transfer units contain valid data), and so forth.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The memory sub-system can initiate media management operations, such as a write operation, on host data that is stored on a memory device. For example, firmware of the memory sub-system can re-write previously written host data from a location of a memory device to a new location as part of garbage collection management operations. The data that is re-written, for example, as initiated by firmware, is hereinafter referred to as "garbage collection data."

"User data" hereinafter generally refers to host data and garbage collection data. "System data" hereinafter refers to data that is created and/or maintained by the memory sub-system for performing operations in response to host request and for media management. Examples of system data include, and are not limited to, system tables (e.g., logical-to-physical memory address mapping table (also referred to herein as a L2P table)), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest areas that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same device package.

A traditional computer system, such as a conventional supercomputer, can use garbage collection operations where invalid or stale data content of non-volatile memory (e.g., negative- and (NAND) device) is periodically erased to allow fresh data to be written to the non-volatile memory. However, conventional methodologies for garbage collection can involve data movements (e.g., between a host system and a memory sub-system) that are time and energy consuming. Conventional memory systems handle physical limitations of such memory systems by implementing algorithms for wear leveling. Wear leveling allows data to be written to various physical locations of memory systems to distribute the wear on the memory systems at an even pace. Garbage collection algorithms identify and relocate memory from one location to another in tandem with wear leveling algorithms to extend the life of the memory system. In conventional non-volatile memory (such as NAND devices), data cannot be written to the same location twice without erasing the existing data. The memory device is divided into blocks and the blocks are further divided into pages. Although data can be written directly into a page, the whole block must be erased before the page can be written to again. To reclaim the space taken by old, invalid, or stale data, the entire block must be searched to relocate valid data before the whole block is erased. After erasure, the block is ready for new valid data to be written.

The memory-sub system can include a flash translation layer (FTL) software which allows operating systems to read and write to memory devices. The FTL can provide the translation from virtual to physical memory addresses which can invoke operations including wear leveling and garbage collection. Some memory devices (e.g., NAND flash) cannot write data to locations containing data. Instead, the location is first erased of any data before new data can be written to it. Erasing operations typically take a long time as erase operations are done one block at a time. Instead of erasing before writing data each time, the data is typically written to an empty location and the location that contained the data is marked invalid.

When a physical location of data becomes full or close to being full, garbage collection operations are performed to relocate valid data into a new (free) area and erases the original invalid data. Conventional garbage collection operations include (a) selecting blocks meeting conditions for erasure, (b) copying valid data into a separate location, and (c) erasing the selected blocks.

A workload is typically a set of input/output characteristics that interface between a host and a storage device. The workload impacts bandwidth and latency. Typically, NAND devices switch between single and mixed workload scenarios depending on the operations received from the host device. While in a single workload scenario, operations such as garbage collection can be run. However, during a mixed workload scenario, the host uses resources that cannot be allocated to resource intensive operations such as garbage collection. In other words, in a typical mixed workload scenario, the host controller cannot perform both read/write commands in tandem with garbage collection operations as it is too expensive in terms of resources.

Instead, the inventors have contemplated, among other things, a method and corresponding system to consider mixed workload scenarios while still processing data operations based on valid memory counts such as garbage collection operations.

This multi-dimensional model accounts for the physical position information such as a LUN. Additionally, and/or alternatively, a robust single-cursor garbage collection design has been contemplated to reduce latency, power consumption, and firmware overhead. The novel single-cursor garbage collection design can identify specific segments of NAND blocks for immediate erasure to avoid power limitations/throttling.

Aspects of the present disclosure address the above and other issues by having a memory sub-system for performing data operations based on valid memory count. In particular, various embodiments enable effective wear leveling and garbage collection operations to perform on the memory device to extend the lifespan of the memory device and to improve performance.

By use of various embodiments, data operations based on valid memory count can be performed on a memory device or a memory sub-system. Additional operations include wear leveling and garbage collection. Accordingly, some embodiments can accelerate data erasures and save time and energy consumed by garbage collection operations on a memory device. With respect to transactional memory, a data operation mechanism based on valid memory count can be used to enable a memory device or a memory sub-system to anticipatorily erase blocks of data to increase garbage collection efficiency. In this way, a memory device of various embodiments can obviate the need for use of a costly, energy-hungry approach to handle and resolve garbage collection operations.

Though various embodiments are described herein with respect to a memory sub-system controller, some embodiments implement features described herein (e.g., operations for garbage collection, wear-leveling) as part of a memory device (e.g., a controller, processor, or state machine of a memory die). For instance, various embodiments implement garbage collection operations as part of a controller, processor, or state machine for each bank within a memory device.

Benefits include the ability for data operations to perform throughout mixed-workload scenarios, the need for only a single-thread architecture, and the ability to anticipatorily erase blocks with empty and/or invalid data.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110. The host system 120 can be a computing device such as a desktop computer, laptop computer, network server, mobile device, or such computing device that includes a memory and a processing device.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Low Power Double Data Rate (LPDDR), or any other suitable interface. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative- and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells such as single level cells (SLCs) or multi-level cells (MLCs) (e.g., triple level cells (TLCs), quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or memory blocks that can refer to a unit of the memory component used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a data operation component 113 that can enable or facilitate performance of data operations based on valid memory count of memory units on a memory device (e.g., memory device 130, 140). For some embodiments, the data operator based on valid memory count enables the memory system to maintain a healthy level of clean memory units to perform data operations such as write operations. The data operation component 113 can enable the memory sub-system 110 (via the memory sub-system controller 115) to perform operations including garbage collection operations. The memory-sub system can maintain a count of valid memory units, an indicator of how many memory units of a particular block of memory units contain valid data. By utilizing the count of valid memory units, the memory sub-system (via the memory sub-system controller 115) can perform data operations to free up memory units for future write operations.

The data operation component 113 can determine, based on the valid memory count, which memory block will require the least amount of bandwidth and processing power to achieve a maximum amount of clean storage space. Additionally, by utilizing the valid memory count, the memory sub-system can initialize a data erasure operation without performing another operation to identify and relocate valid data, as performed in conventional systems.

Further details with regards to the operations of the data operation component 113 are described below. An example of this is illustrated and described herein with respect to FIGS. 2A and 2B.

Figure 2A:
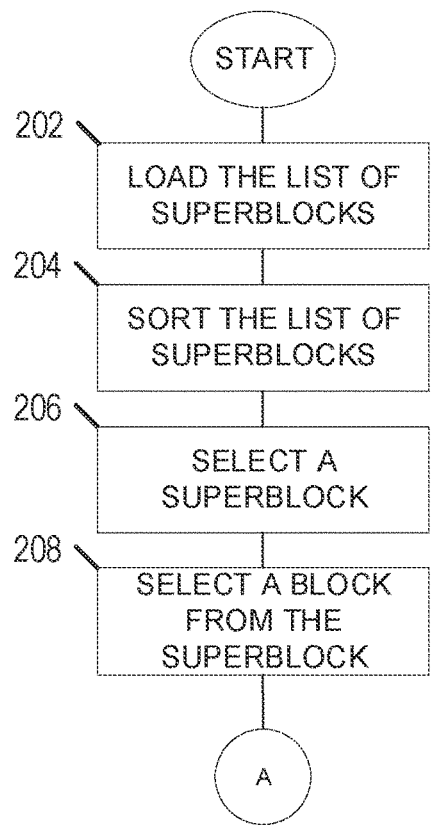
FIGS. 2A-B illustrates an example diagram of how memory blocks are selected for data operations based on valid memory count in accordance with some embodiments of the present disclosure.
Figure 2B:
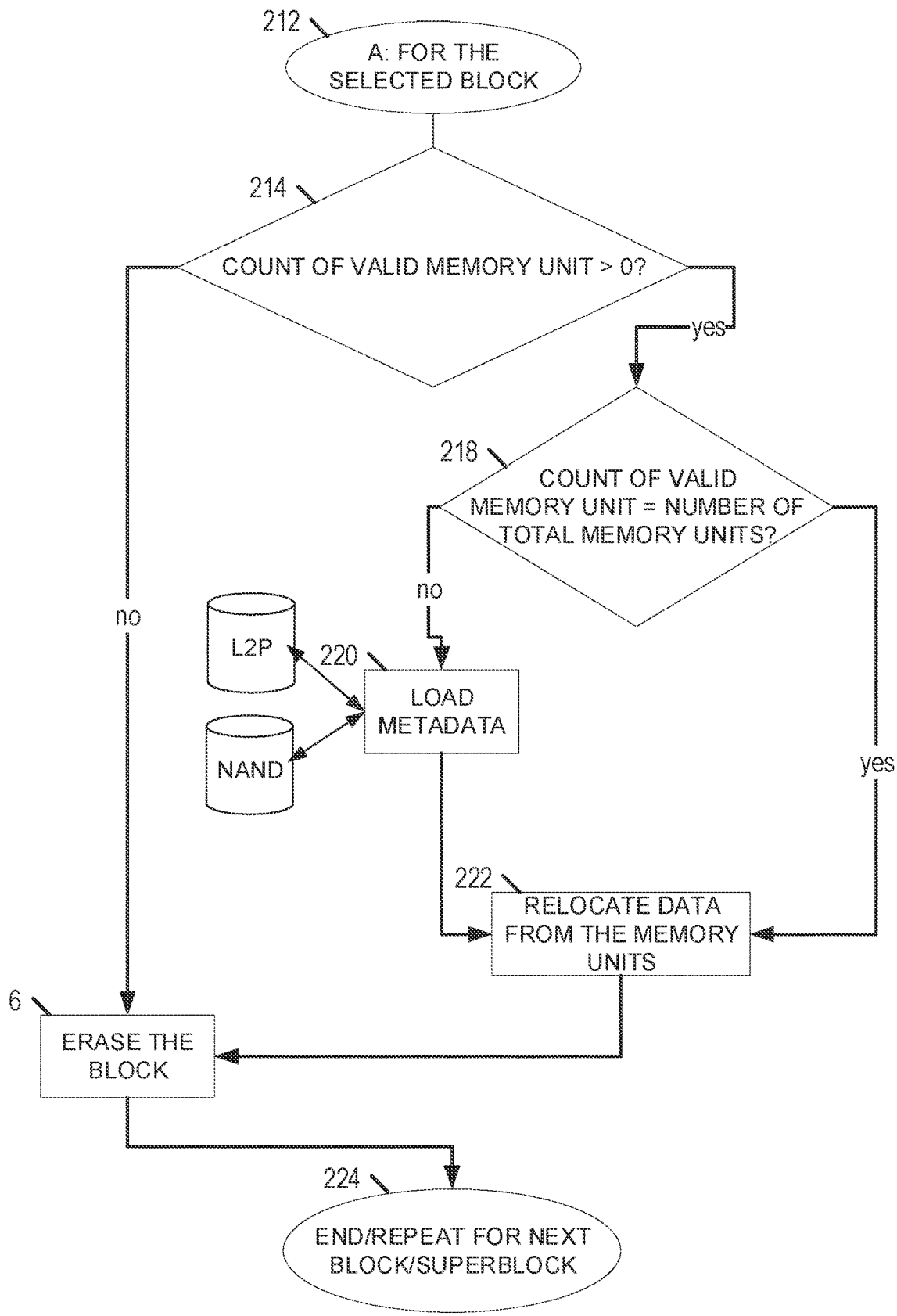

FIG. 2A-2B illustrates a flow diagram of an example method for applying operations based on valid memory count of memory units in accordance with some embodiments of the present disclosure. The method 200 begins at the host system or alternatively at the memory controller to load (operation 202) a list of groups of memory blocks (also referred to herein as one or more "superblocks") identifying one or more superblocks within the memory device that includes data. The memory controller sorts (operation 204) the list of superblocks based on a number of valid memory unit counts. The valid memory unit counts indicate a number of memory units having valid data. This can be accomplished by comparing the expected value of each memory unit to the actual value of each memory unit found by performing a P2L lookup to find the physical address mapped to the logical address and then again using the logical address in an L2P table to look up the corresponding physical address. If both the physical and logical addresses of each lookup match each other, then the data is valid, and the memory cell associated with the logical address is marked as containing valid data. However, when the physical and logical addresses do not match, the data is invalid and is also marked as such. The list can be organized in a hierarchical manner of a lowest to highest or highest to lowest valid memory unit count. The list of valid and invalid data can be maintained at different granularities including at the superblock level, block level, and memory unit level.

At operation 206, the processing device selects a superblock from the list of superblocks. The selected superblock includes one or more blocks. The selection of the superblock can be based on the number of valid memory count of the superblock. In some embodiments, the superblock with the lowest count of valid memory counts is selected as it takes the least amount of resources to perform such operations and results in usable data storage in the least amount of time.

Thereafter, at operation 208, the processing device selects a block from the superblock. The selected block is transitionally labeled "target block" throughout the operation. The selected "target block" can be a block with the least amount of valid memory counts within the superblock. As described above, valid memory counts are maintained at the superblock, block, and even at the memory cell levels. Each superblock can include one or more blocks, and each block can include one or more memory cells.

The method 200 continues at operation 212 in FIG. 2B. At operation 214, the processing device determines whether the count of valid memory units of the selected "target block" is higher than zero. If no, meaning the count of valid memory units is equal to zero and the target block does not include any valid data, then at operation 216 the processing device erases the block. If yes, the block includes one or more memory units storing valid data and the method 200 proceeds to 218. This data needs to be identified and relocated before the block can be erased.

At operation 218, the processing device determines if the count of valid memory units is equivalent to the number of total memory units. If so, this means that the entire block is full of valid data. If no, the block includes some valid, and some invalid, data. When the block includes some valid and some invalid data, at operation 220, metadata is loaded to determine which memory units of the target block include valid data. The controller can maintain a count of valid memory units but does not necessarily keep track of which individual cells hold valid or invalid data. At operation 220, the target block is subject to metadata search for valid data. As described above with respect to FIG. 2A, physical addresses' corresponding logical addresses are looked up to determine whether the physical address is in fact the physical address of the valid data. If there is a match between the physical and logical addresses, the data within the physical address is valid and is marked for relocation. If there is no match, there is no need for relocation and the physical address will be erased in a later operation.

Thereafter, as shown at operation 222, the processing device relocates data from the memory units to a new location. The new location can be in a separate block in a separate superblock that is not currently subject to garbage collection operations.

The selected block is erased at operation 216 (see operation 222), and in some embodiments, the method 200 ends at operation 224. However, if the selected superblock includes more blocks with valid data, the method 200 can be repeated as many times as needed to erase each block of the superblock to obtain clean blocks.

Figure 3A:
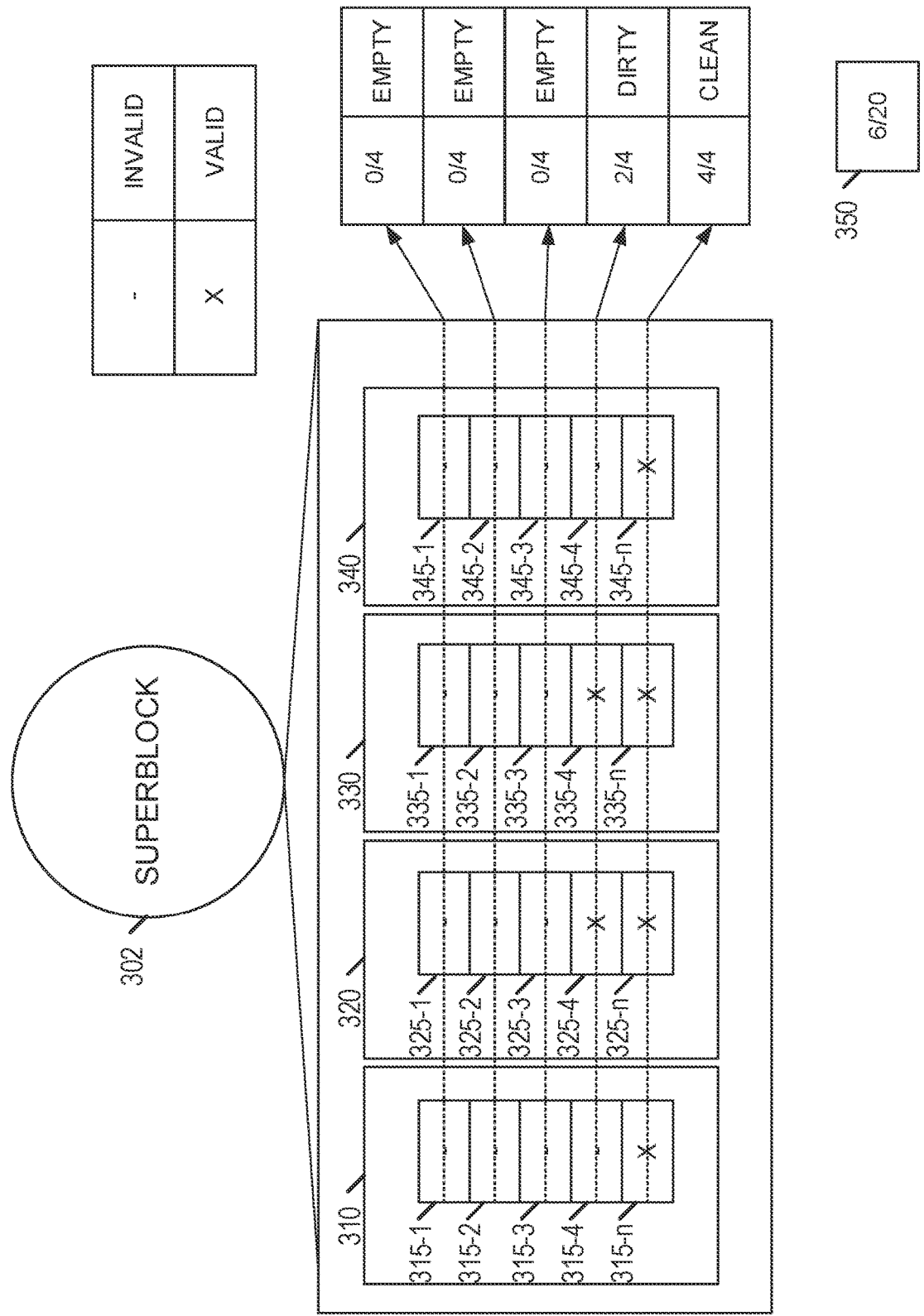
FIGS. 3A-B illustrates a flow diagram of an example method for applying data operations based on valid memory count of memory units on a memory device in accordance with some embodiments of the present disclosure.
Figure 3B:
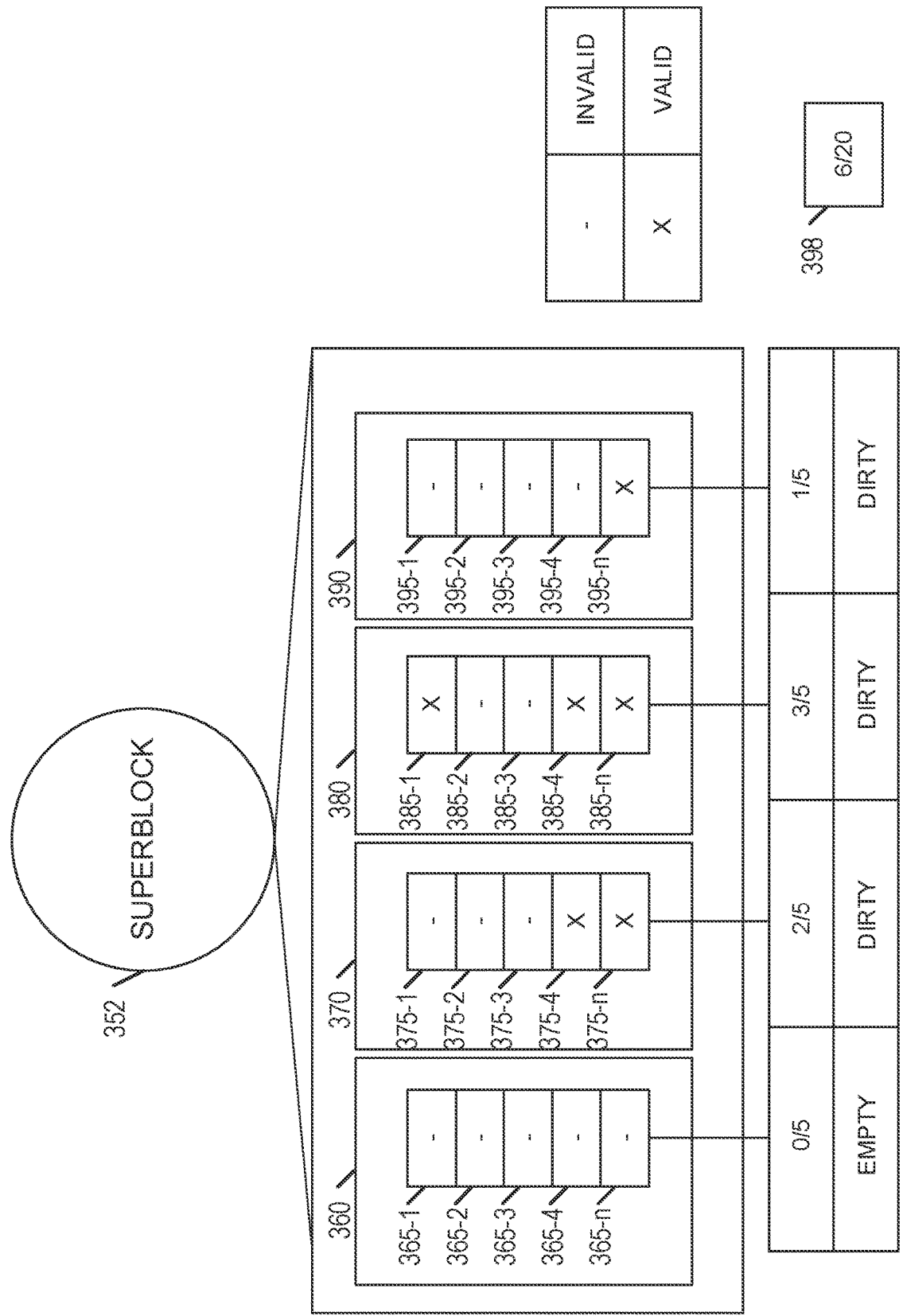

FIGS. 3A and 3B show an illustration of an example of performing data operations on a selected superblock in accordance with some embodiments of the present disclosure. In the context of FIG. 3A, a superblock 302 is selected for data operations including garbage collection. Superblock 302 can include multiple blocks such as block 310, 320, 330, and 340. Each of blocks 310, 320, 330, and 340 can include one or more memory cells such as 315-1, 315-2, 315-3, 315-4 to 315-n.

As shown, superblock 302 has four distinct blocks 310, 320, 330, and 340. Each of the distinct blocks has five pages of memory cells. For blocks 310 and 340, only one of the five pages of memory cells includes a memory cell (e.g., cell 315-n and 345-n) with valid data. For block 320 and 330, two of the five pages of memory cells include a memory cell with valid data. By identifying which blocks have the lowest number of memory cells with valid data, the controller can select a block to relocate and erase that requires the least amount of resources to accomplish.

Further, each block within the superblock can be mapped for the controller to determine which memory cell within the block contains the valid data. The memory controller can identify pages across multiple blocks that contain valid data. For example, pages 315-4, 325-4, 335-4, and 345-4 are pages across blocks 310, 320, 330, and 340.

The controller can identify that within the page, there are two valid memory counts. However, the controller may not necessarily know which page contains the valid data. As described with respect to operation 220 in FIG. 2B, the controller will parse the block to find the memory unit with the valid data. The memory controller can be programmed to map the valid memory counts per cell across pages and/or per block. The valid memory count for the superblock is maintained at indicator 350 indicating that for superblock 302, there are six valid memory cells out of twenty.

The architecture of the operation can be implemented in a first scenario such as the one described with respect to FIG. 2A by looking at memory cells across multiple pages to determine which block to erase. A second scenario is described with respect to FIG. 2B.

FIG. 3B shows an illustration of an example superblock implementing the data operations based on valid memory count in accordance with some embodiments of the present disclosure. Similar to FIG. 3A, a superblock 352 is selected for data operations including garbage collection. Superblock 352 can include multiple blocks such as block 360, 370, 380, and 390. Each of the blocks can include one or more memory cells such as 365-1 through 365-n.

The memory controller determines superblock 352 has a valid memory count of six and maintains the count at indicator 398. The superblock 352 contains four distinct blocks each having five memory cells. The superblock 352 thus has a valid memory count of six out of twenty.

Again, for each block, the memory controller determines a block-specific valid memory count. In the shown example of FIG. 3B, block 360 has zero valid memory cells out of five. While the memory controller is determining the block-specific valid memory count for each block, if the block has a valid memory count of zero, the memory controller can queue block 360 for immediate erasure. The memory controller can then move on to block 370 to determine the valid memory count. In this scenario, the memory controller determines that block 370 has two valid memory cells, block 380 has three valid memory cells, and 390 has one valid memory cell. Based on the valid memory count, the memory controller can choose to perform garbage collection operations on block 390 because of the lowest valid memory count, then block 370, then block 380.

Both methods of identifying which memory cell to relocate and/or erase, as described in FIGS. 3A and 3B, can be implemented in accordance with the method described herein. In some embodiments, both methods of identifying memory cells by pages and by blocks are implemented together. It is understood and appreciated that the disclosure of FIG. 3A and FIG. 3B can be used in tandem, alone, or a combination of the two.

Figure 4A:
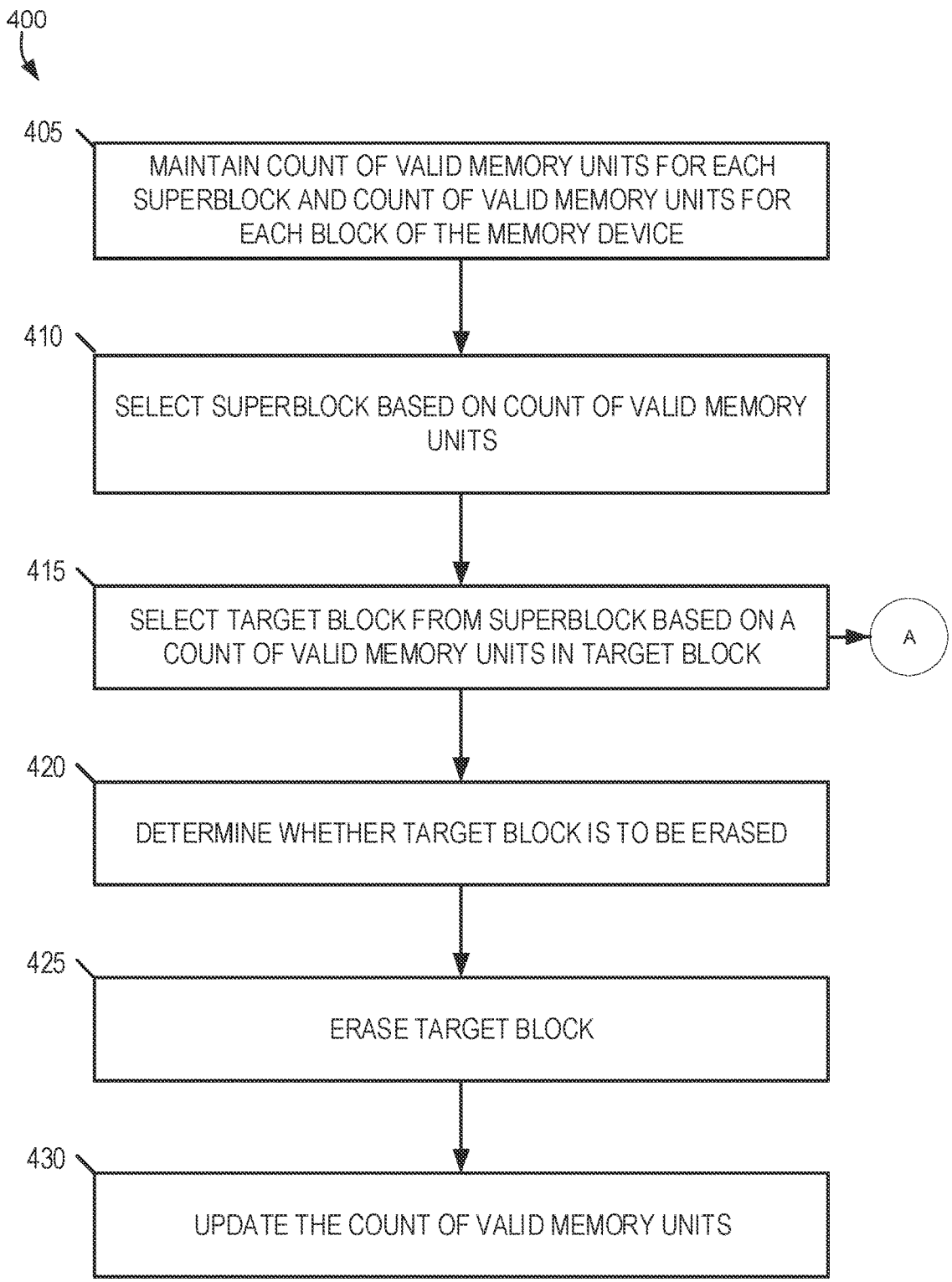
FIGS. 4A-4B illustrates a flow diagram of an example method for performing operations based on valid memory count of memory units on a memory device in accordance with some embodiments of the present disclosure.

FIG. 4A is a flow diagram of an example method 400, similar to method 200, to perform data operations based on valid memory counts in accordance with some embodiments of the present disclosure. Method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 400 of FIG. 4, the method 400 illustrates an example of performing data operations based on valid memory count in accordance with some embodiments. At operation 405, the processing device maintains a count of valid memory units for each superblock and a count of valid memory units for each block of the memory device.

At operation 410, the processing device selects a first superblock based on a count of valid memory units of the first superblock. Each valid memory unit stores valid data and the first superblock includes a target plurality of blocks. After selecting the first superblock, the processing device can sort blocks in the target plurality of blocks based on a count of valid memory units in each block in the target plurality of blocks. Sorting the blocks can include sorting the blocks in ascending order of counts of valid memory units.

The processing device then selects a target block based on a count of valid memory units in the first target block (see operation 415). The processing device can select a target block in manners such as those discussed in FIGS. 2A and 2B. For example, the processing device can select a target block based on (i) a lowest valid memory count, (ii) the valid memory count being equal to zero, or (iii) the valid memory count being equal to the number of memory cells within the block.

Figure 4B:
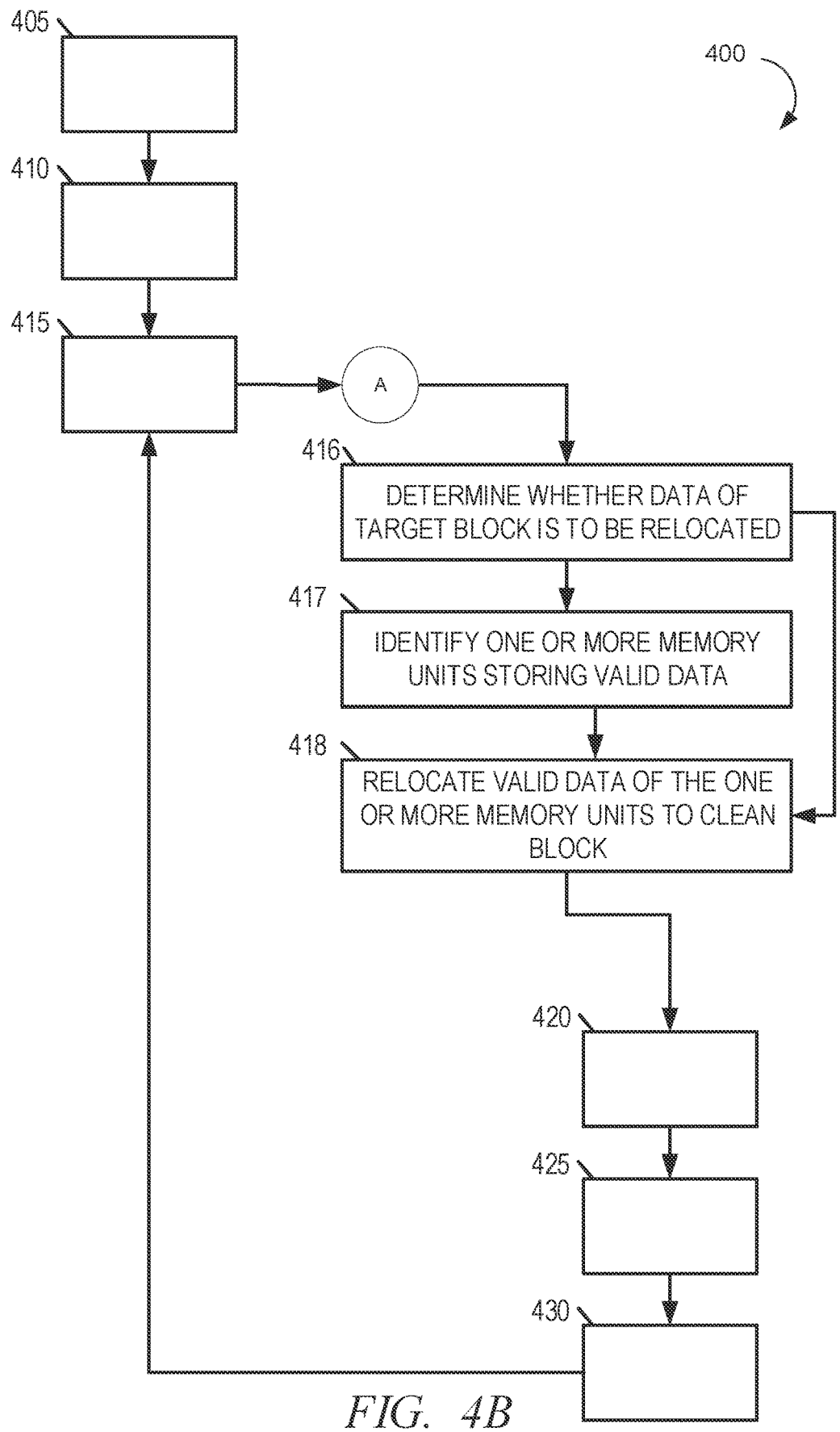

In FIG. 4B, the processing device at method 400 performs additional and/or alternative operations as shown in FIG. 4A.

The method 400 then proceeds to operation 416 where the processing device determines whether data of the target block is to be relocated. The valid memory count of the target block indicates if there is dirty data, empty cells, or valid data. When the valid memory count is zero, there are no cells containing valid data. When the valid memory count is higher than zero, there are cells containing valid data. When the valid memory count is equal to the number of memory cells, all of the memory cells contain valid data and the entirety of the memory cells require the data stored within to be relocated before it can be erased.

The processing device, at operation 417, identifies one or more memory units storing valid data. As described with respect to operation 220 of FIG. 2B, the processing device looks up which memory units of the block include valid data.

At operation 418, the processing device relocates the valid data of the one or more memory units to a clean block. In some embodiments, the clean block is an unoccupied block within a distinct superblock that is not currently subject to data operations such as garbage collection. In some embodiments, the clean block is a partially occupied block having one or more memory units storing valid data, the partially occupied block being in a distinct superblock that is not currently subject to data operations. In some embodiments, the clean block is a previously erased block within the current superblock subject to data operations.

Returning back to the operation described in FIG. 4A, at operation 420, the processing device determines whether the target block is to be erased. The processing device can check to see the valid memory count is at zero to determine whether the target block is to be erased. In some embodiments, the processing device can parse through the block to confirm there are no memory units containing valid data before erasing the block.

The method then proceeds to operation 425 where the processing device erases the target block. The target block is then cleared of any old or invalid data and is ready to be written to again.

At operation 430, the processing device updates the count of valid memory units based on erasing the target block. After erasing the target block, the count of valid memory units for the superblock is updated to reflect that the target block has a zero valid memory unit count. At operation 430, when the count of valid memory units are updated, the processing device can continue to perform data operations within the superblock, begin performance of data operations at a separate superblock, or cease data operations relating to garbage collections.

In an example, a memory device includes a plurality of superblocks. Each superblock includes a plurality of blocks and each block includes a plurality of memory units. The memory device includes a memory controller configured to maintain a count of valid memory units in the superblock for each superblock of the memory device. The memory controller also maintains a count of valid memory units in each block of the memory device. The memory controller then selects a first superblock based on a count of valid memory units in the first superblock. From the superblock, a first target block is selected based on a count of valid memory units in the first target block. The memory controller determines whether the first target block is to be erased based on the count of valid memory units. If the count of valid memory units is zero, the memory controller erases the first target block. After erasing the first target block, the memory controller selects a second target block based on a count of valid memory units in the second target block and determines whether the second target block includes data to be relocated. In response to determining that data of the second target block is to be relocated, the memory controller identifies the one or more memory units of the second target block storing valid data and relocates the valid data to a clean block. The clean block can be a clean block in a second superblock of the plurality of superblocks. After relocating the valid data to the clean block, the memory controller erases the second target block and updates the count of valid memory units in the target plurality of blocks. The memory controller can select a subsequent target block based on a count of valid memory units in the subsequent target block and determine whether data of the subsequent target block is to be relocated based on the count of valid memory units in the subsequent target block. In response to determining that the data of the subsequent target block is to be relocated, the memory controller identifies one or more memory units of the subsequent target block storing valid data, relocates the valid data to a clean block of a second superblock, and erases the subsequent target block. The memory controller then updates the count of valid memory units in the target plurality of blocks based on erasing the subsequent target block. This process by the memory controller can continue until the valid memory count of the first superblock is zero. This process can be paused or terminated according to the memory controller's processing needs.

In another example, a memory device includes a plurality of superblocks. Each superblock includes a plurality of blocks and each block includes a plurality of memory units. The memory device includes a memory controller configured to maintain a count of valid memory units in the superblock for each superblock of the memory device. The memory controller also maintains a count of valid memory units in each block of the memory device. The memory controller then selects a first superblock based on a count of valid memory units in the first superblock. From the superblock, a first target block is selected based on a count of valid memory units in the first target block. The memory controller determines whether the first target block is to be erased based on the count of valid memory units. If the count of valid memory units is zero, the memory controller erases the first target block. After erasing the first target block, the memory controller selects a second target block based on a count of valid memory units in the second target block being equal to a total number of memory units of the second target block and relocates all data of the second target block to a clean block of a second superblock. The memory controller erases the second target block and updates the count of valid memory units in the target plurality of blocks based on erasing of the second target block. The memory controller can identify, from the target plurality of blocks, each subsequent target block of the target plurality of blocks having a corresponding count of valid memory units being equal to a total number of memory units of the target block, and for each subsequent target block, relocates all data in the subsequent target block to a second clean block of a second superblock of the plurality of superblock, erasing the subsequent target block and updating the count of valid memory units in the target plurality of blocks based on the erasing of the subsequent target block. This process by the memory controller can continue until the valid memory count of the first superblock is zero. This process can be paused or terminated according to the memory controller's processing needs.

Figure 5:
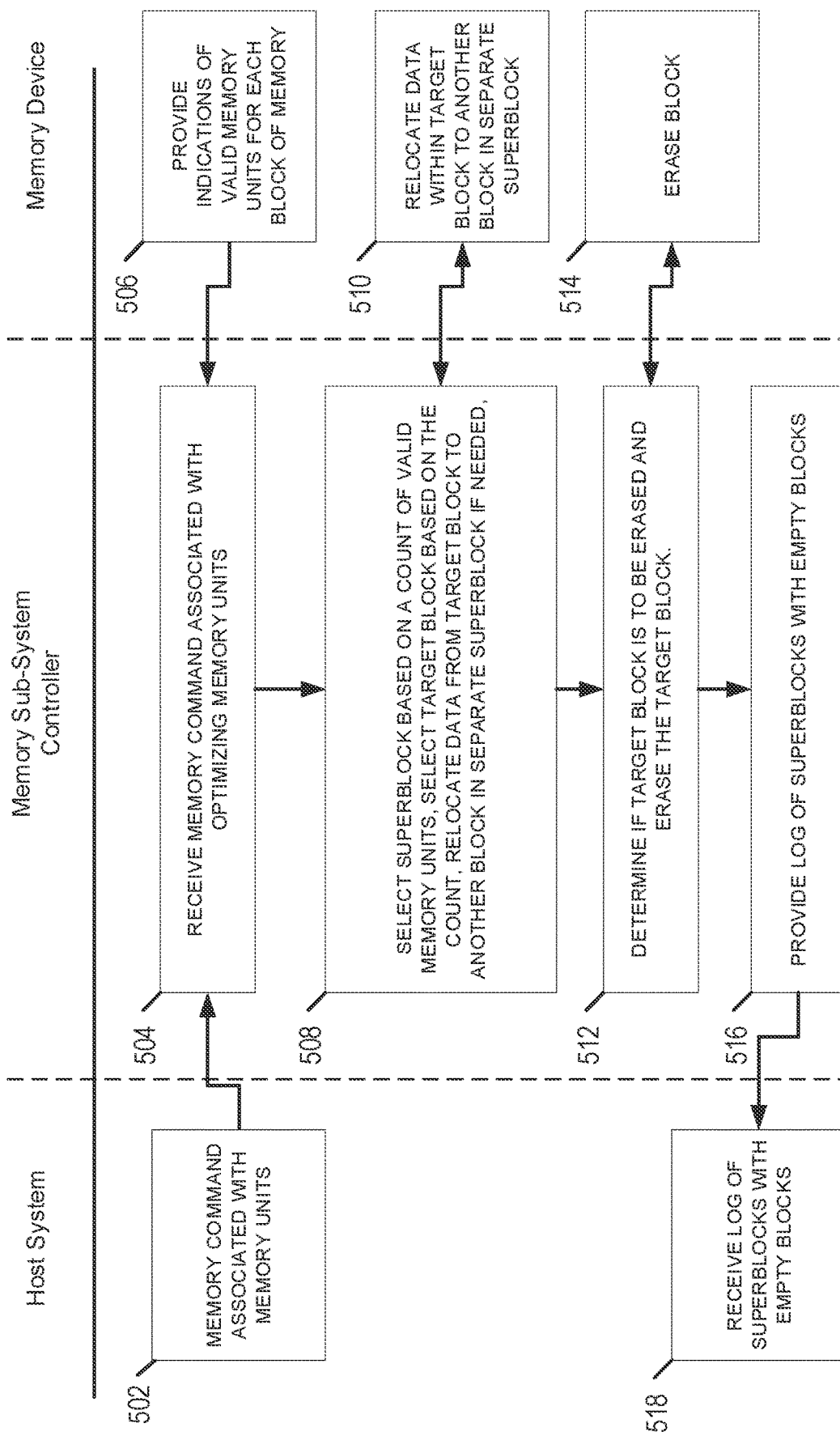
FIG. 5 illustrates an interaction diagram providing interactions between components of a computing environment in the context of some embodiments in which a method that uses allocation techniques of data on a memory device as described herein is performed.

FIG. 5 provides an interaction diagram illustrating interactions between components of a computing environment in the context of some embodiments in which a method that uses allocation techniques of data on a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, and/or alternatively, one or more processes can be omitted in various embodiments. Thus, not all processes are used in every embodiment. In the context of the example illustrated in FIG. 5, the host system can include the host system 120, the memory sub-system controller can include the memory sub-system controller 115, and the memory device can include the memory device 140.

As shown in FIG. 5, at operation 502, the host system sends a memory command to the memory sub-system 110 in association with a memory unit. At operation 504, the memory sub-system controller 115 receives the memory command associated with optimizing memory units. The memory device, at operation 506, provides indication of valid memory units for each block of memory. In some embodiments, the flash translation layer can maintain a count of valid memory units for each block of memory.

In response to the memory command received at operation 504, the memory sub-system controller 115 performs a garbage collection operation. The garbage collection operation includes, at operation 508, selecting a first superblock based on a count of valid memory units, selecting a target block based on the count of valid memory units, and relocating data from the target block to another block in a separate superblock. At operation 510, the memory device relocates data within the target block to another block in a separate superblock. For example, superblock #1 is subject to garbage collection operations. Superblock #1 includes a target block 1. Data stored within target block #1 is subject to the garbage collection operation and in accordance with some embodiments, the data within target block #1 is relocated to block A within superblock #2.

The memory controller determines whether the target block is ready to be erased (e.g., if all valid data has been relocated) and erases the target block in accordance with the determination that the target block is ready to be erased (see operation 512).

In accordance with the determination at operation 512 that the target block is to be erased, at operation 514, the target block is erased. After the target block is erased, at operation 516, the memory controller provides a log of superblocks having empty blocks to the host system, to which the host system receives at operation 518.

The host system can then decide to repeat the steps of 502-518 with another select superblock such as a second superblock within the memory device based at least in part on the received log indicating a number of empty blocks.

Figure 6:
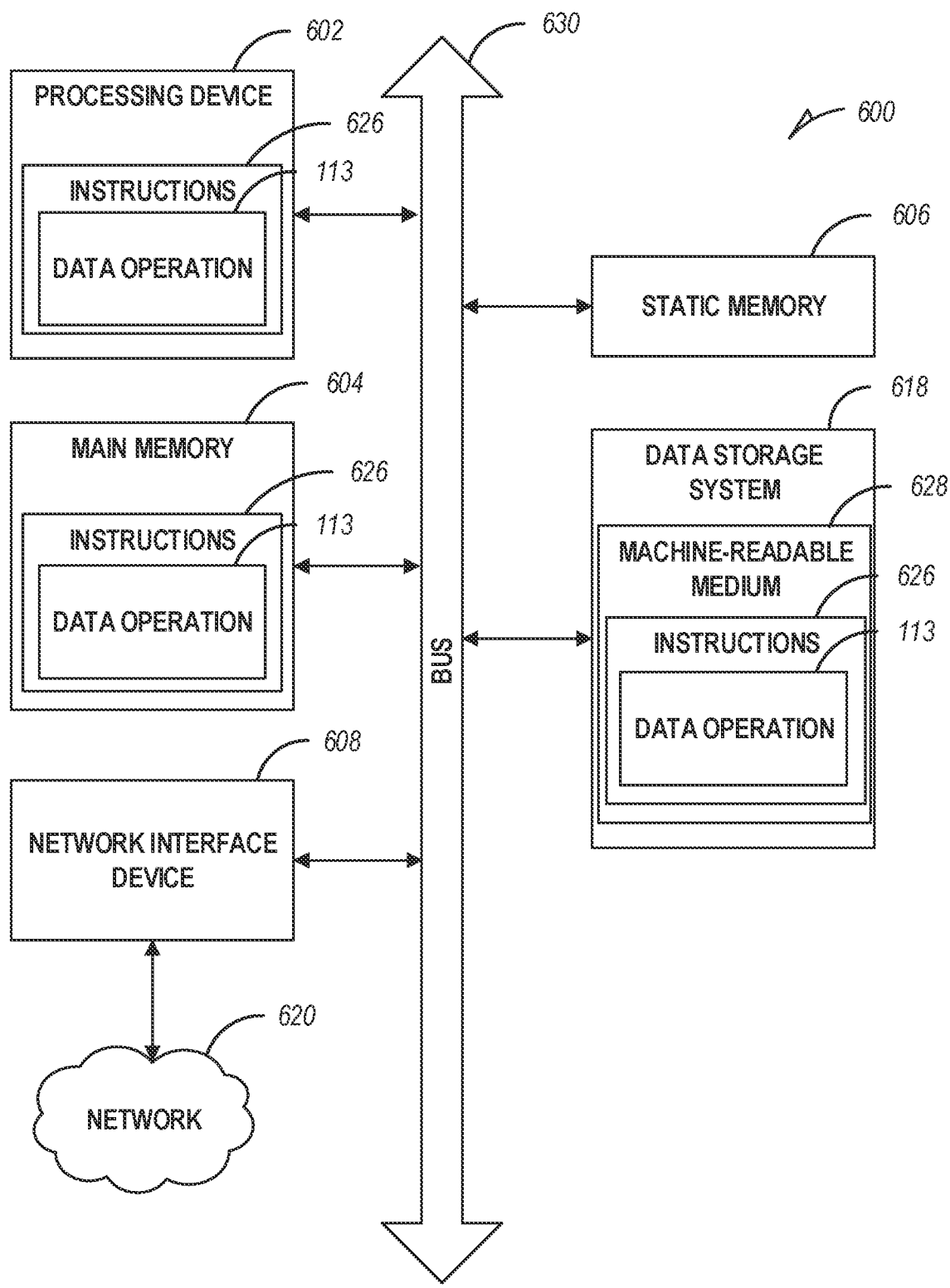
FIG. 6 is a block diagram of an example computer system in which embodiments of the present disclosure may operate.

FIG. 6 illustrates an example machine of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data operator based on data operator component 109 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 628 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data operation based on valid memory count component (e.g., the data operator component 109 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
 a memory device comprising a plurality of groups of blocks, each group comprising a plurality of blocks, and each block comprising a plurality of memory units, the plurality of groups being identified by a list of groups; and
 a memory controller configured to perform operations comprising:
  maintaining, for each group of the plurality of groups, a count of all valid memory units in the group;
  maintaining, for each block of the memory device, a count of all valid memory units in the block;
  sorting the list of groups based on a count of all valid memory units of each group in the list of groups;
  selecting, based on the sorted list of groups, a first group that has a count of all valid memory units in the first group that is a lowest count in the list of groups, each valid memory unit storing valid data, the first group comprising a target plurality of blocks;
  selecting, from the target plurality of blocks, a first target block based on a count of all valid memory units in the first target block;
  determining whether the first target block is to be erased based on the count of all valid memory units in the first target block; and
  erasing the first target block in response to determining that the first target block is to be erased.

2. The system of claim 1, wherein the selecting the first target block comprises selecting the first target block based on the count of all valid memory units in the first target block being zero.

3. The system of claim 1, wherein the operations further comprise, after selecting the first group, sorting blocks in the target plurality of blocks based on a count of all valid memory units in each block in the target plurality of blocks.

4. The system of claim 1, wherein after erasing the first target block, the memory controller performs operations further comprising:
updating the count of all valid memory units in the target plurality of blocks based on the erasing of the first target block.

5. The system of claim 4, further comprising:
identifying, from the target plurality of blocks, each individual target block of the target plurality of blocks having a corresponding count of valid memory units equal to zero; and
for each individual target block, erasing the individual target block.

6. The system of claim 1, wherein the operations further comprise:
selecting, from the target plurality of blocks, a second target block based on a count of all valid memory units in the second target block;
determining whether data of the second target block is to be relocated based on the count of all valid memory units in the second target block; and
in response to determining that data of the second target block is to be relocated:
identifying one or more memory units of the second target block storing valid data;
relocating the valid data of the one or more memory units to a clean block of a second group of the plurality of groups;
erasing the second target block; and
updating the count of all valid memory units in the target plurality of blocks based on the erasing of the second target block.

7. The system of claim 6, further comprising:
selecting, from the target plurality of blocks, a third target block based on a count of all valid memory units in the third target block;
determining whether data of the third target block is to be relocated based on the count of all valid memory units in the third target block; and
in response to determining that data of the third target block is to be relocated:
identifying one or more memory units of the third target block storing valid data;
relocating the valid data of the one or more memory units to a clean block of a second group of the plurality of groups;
erasing the third target block; and
updating the count of all valid memory units in the target plurality of blocks based on erasing the third target block.

8. The system of claim 1, wherein the operations further comprise:
after erasing the first target block:
selecting, from the target plurality of blocks, a second target block based on a count of all valid memory units in the second target block being equal to a total number of memory units of the second target block;
relocating all data of the second target block to a clean block of a second group of the plurality of groups;
erasing the second target block; and
updating the count of all valid memory units in the target plurality of blocks based on the erasing of the second target block.

9. The system of claim 8, further comprising:
identifying, from the target plurality of blocks, each individual target block of the target plurality of blocks having a corresponding count of valid memory units that is equal to a total count of memory units in the individual target block; and
for each individual target block:
relocating all data in the individual target block to a second clean block of a second group of the plurality of groups;
erasing the individual target block; and
updating the count of all valid memory units in the target plurality of blocks based on the erasing of the individual target block.

10. The system of claim 1, wherein the operations are performed as part of a garbage collection process performed on the memory device.

11. A method comprising:
maintaining, by a memory controller of a memory system, a count of all valid memory units in each group of a plurality of groups of blocks of a memory device and a count of all valid memory units in each block of the memory device, the memory system comprising the memory device, each valid memory unit storing valid data, each group comprising a plurality of blocks, each block comprising a plurality of memory units, the plurality of groups being identified by a list of groups;
sorting the list of groups based on a count of all valid memory units of each group in the list of groups;
selecting, based on the sorted list of groups, a first group that has a count of all valid memory units that is a lowest count in the list of groups, the first group comprising a target plurality of blocks;
selecting, from the target plurality of blocks, a first target block based on a count of all valid memory units of the first target block being equal to a total number of memory units of the first target block;
relocating all data in the first target block to a clean block of a second group of the plurality of groups; and
erasing the first target block.

12. The method of claim 11, further comprising:
sorting blocks in the target plurality of blocks based on a count of all valid memory units of each block in the target plurality of blocks.

13. The method of claim 11, further comprising:
identifying, from the target plurality of blocks, each individual target block of the target plurality of blocks having a corresponding count of valid memory units that is equal to a total count of memory units in the target block; and
for each individual target block:
relocating all data in the individual target block to a second clean block of a second group of the plurality of groups;
erasing the individual target block; and
updating the count of all valid memory units in the target plurality of blocks based on the erasing of the individual target block.

14. The method of claim 11, further comprising:
selecting, from the target plurality of blocks, a second target block based on a count of all valid memory units of the second target block;
determining whether data of the second target block is to be relocated based on count of all valid memory units of the second target block; and
in response to determining that data of the second target block is to be relocated:
identifying one or more memory units of the second target block storing valid data;

relocating the valid data of the one or more memory units to a second clean block of a second group of the plurality of groups;
erasing the second target block; and
updating the count of all valid memory units in the target plurality of blocks based on the erasing of the second target block.

15. The method of claim 11, further comprising:
selecting, from the target plurality of blocks, a second target block based on a count of all valid memory units of the second target block being equal to zero;
erasing the second target block; and
updating the count of all valid memory units in the target plurality of blocks based on the erasing of the second target block.

16. A non-transitory machine-readable storage medium comprising instructions that, when executed by a processing device of a memory system, cause the processing device to:
maintain a count of all valid memory units for each group of a plurality of groups of blocks of a memory device and a count of all valid memory units in each block of the memory device, the memory system comprising the memory device, each valid memory unit storing valid data, each group comprising a plurality of blocks, each block comprising a plurality of memory units, the plurality of groups being identified by a list of groups;
sorting the list of groups based on a count of all valid memory units of each group in the list of groups;
select, based on the sorted list of groups of blocks, a first group that has a count of all valid memory units that is a lowest count in the list of groups, the first group comprising a target plurality of blocks;
sort blocks in the target plurality of blocks based on a count of all valid memory units of each block in the target plurality of blocks;
select, from the target plurality of blocks, a first target block based on a count of all valid memory units of the first target block;
determine whether data of the first target block is to be relocated based on the count of all valid memory units of the first target block; and
in response to determining that data of the first target block is to be relocated:
identify one or more memory units of the first target block storing valid data;
relocate the valid data of the one or more memory units to a clean block of a second group of the plurality of groups; and
erase the first target block.

17. The storage medium of claim 16, wherein the instructions further comprise instructions to:
select, from the target plurality of blocks, an individual target block based on a count of all valid memory units in the individual target block;
determine whether data of the individual target block is to be relocated based on the count of all valid memory units in the individual target block; and
in response to determining that data of the individual target block is to be relocated:
identify one or more memory units of the second target block storing valid data;
relocate the valid data of the one or more memory units to a clean block of a second group of the plurality of groups;
erase the individual target block; and
update the count of all valid memory units in the target plurality of blocks based on erasing the individual target block.

18. The storage medium of claim 16, wherein the instructions further comprise instructions to:
select, from the target plurality of blocks, a second target block based on a count of all valid memory units of the second target block being equal to zero;
erasing the second target block; and
updating the count of all valid memory units in the target plurality of blocks based on erasing the second target block.

19. The storage medium of claim 16, wherein the instructions further comprise instructions to:
select, from the target plurality of blocks, a second target block based on a count of all valid memory units of the second target block being equal to a total number of memory units of the second target block;
relocate all data in the second target block to a clean block of a second group of the plurality of groups;
erase the second target block; and
update the count of all valid memory units in the target plurality of blocks based on erasing the second target block.

20. The storage medium of claim 16, wherein the instructions are performed as part of a garbage collection process performed on the memory system.

* * * * *